United States Patent
Nakazawa (10) Patent No.: US 8,526,585 B2
(45) Date of Patent: Sep. 3, 2013

(54) COMMUNICATION TERMINAL DEVICE (75) Inventor: Kazuo Nakazawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 896 days.

(21) Appl. No.: 12/691,808

(22) Filed: Jan. 22, 2010

(65) Prior Publication Data
US 2010/0189234 A1     Jul. 29, 2010

(30) Foreign Application Priority Data
Jan. 23, 2009   (JP) .................................. 2009-012724

(51) Int. Cl.
H04M 11/00       (2006.01)
(52) U.S. Cl.
USPC ................... 379/93.05; 379/100.01; 379/377; 379/394; 358/442
(58) Field of Classification Search
USPC ................. 379/377, 93.05, 393, 100.01, 394; 348/14.08; 358/442
See application file for complete search history.

(56) References Cited

U.S. PATENT DOCUMENTS

| 7,515,672 | B2 * | 4/2009 | Dupuis et al. ................. 375/377 |
| 2006/0128376 | A1 * | 6/2006 | Alexis ......................... 455/426.1 |
| 2006/0215229 | A1 * | 9/2006 | Ito ................................ 358/442 |

FOREIGN PATENT DOCUMENTS

JP          06-152795 A    5/1994

* cited by examiner

Primary Examiner — Gerald Gauthier
Assistant Examiner — Simon King
(74) Attorney, Agent, or Firm — Marvin A. Motsenbocker; MOTS Law, PLLC (57) ABSTRACT A communication terminal devicecapable of being connected with an external telephone and of receiving and transmitting facsimile data from and to a network, includes: an off-hook detector configured to detect an off-hook condition of the external telephone, an semiconductor DAA (Data Access Arrangement) including an impedance switcher configured to switch impedances and a direct-current resistance switcher configured to switch direct-current resistances; an impedance switching controller configured to instruct the impedance switcher to switch the impedances; a direct-current resistance switching controller configured to instruct the direct-current resistance switcher to switch the direct-current resistances, wherein, when the off-hook detector detects the off-hook condition of the external telephone, the impedance switching controller instructs the impedance switcher to switch the impedances and the direct-current resistance switching controller instructs the direct-current resistance switcher to switch the direct-current resistances.

17 Claims, 7 Drawing Sheets

COMMUNICATION TERMINAL DEVICE

CROSS REFERENCE TO RELATED APPLICATIONS

This application claims priority based on 35 USC 119 from prior Japanese Patent Application No. 2009-012724 filed on Jan. 23, 2009, entitled "COMMUNICATION TERMINAL DEVICE", the entire contents of which are incorporated herein by reference.

BACKGROUND OF THE INVENTION

1. Field of the Invention

The invention is related to a communication terminal device capable of being connected to an external telephone and of transmitting and receiving facsimile data to and from a network.

2. Description of Related Art

A conventional communication terminal device has a communication transformer and a tone detection transformer that are connected to a telephone line, and transmits and receives facsimile data by using the communication transformer upon a facsimile communication, and uses the tone detection transformer, which has a high impedance, to detect CNG signal (calling tone) which is used upon switching between telephone and facsimile (for example, Japanese Patent Application Laid-Open No. 6-152795).

SUMMARY OF THE INVENTION

The communication device using two transformers, which are the communication transformer and the tone-detecting transformer, requires space for these two transformers. For example, if two transformers are mounted on a circuit board, they require a large space, which makes it difficult to improve space efficiency.

A first aspect of the invention is a communication terminal device capable of being connected with an external telephone and of receiving and transmitting facsimile data from and to a network, including: an off-hook detector configured to detect an off-hook condition of the external telephone; a semiconductor DAA (Data Access Arrangement) including an impedance switcher configured to switch impedances and a direct-current resistance switcher configured to switch direct-current resistances; an impedance switching controller configured to instruct the impedance switcher to switch the impedances; and a direct-current resistance switching controller configured to instruct the direct-current resistance switcher to switch the direct-current resistances. When the off-hook detector detects an off-hook condition of the external telephone, the impedance switching controller instructs the impedance switcher to switch the impedances and the direct-current resistance switching controller instructs the direct-current resistance switcher to switch the direct-current resistances.

A second aspect of the invention is a communication terminal device capable of being connected with an external telephone and of receiving and transmitting facsimile data from and to a network, including: a network voltage detector configured to detect a network voltage; an off-hook determiner configured to determine whether or not the external telephone is in an off-hook condition by comparing the voltage detected by the network voltage detector with a reference voltage; a semiconductor DAA including an impedance switcher to switch impedances and a direct-current resistance switcher to switch direct-current resistances; an impedance switching controller configured to instruct the impedance switcher to switch the impedances; and a direct-current resistance switching controller configured to instruct the direct-current resistance switcher to switch the direct-current resistances. When the off-hook determiner determines that the external telephone is off-hook, the impedance switching controller instructs the impedance switcher to switch the impedances and the direct-current resistance switching controller instructs the direct-current resistance switcher to switch the direct-current resistances.

According to the aspects of the invention, the direct-current resistances and the impedances of the semiconductor DAA are switched when the external telephone is off-hook, so that the direct-current resistance and the impedance can be set to predetermined values to adapt an impedance and a direct-current resistance that are seen from the network upon an off-hook state.

DETAILED DESCRIPTION OF THE EMBODIMENTS

Embodiments of the invention are explained by referring to drawings. In the respective drawings referenced herein, the same constituents are designated by the same reference numerals and duplicate explanation concerning the same constituents is omitted. All of the drawings are provided to illustrate the respective examples only.

First Embodiment

Figure 1:
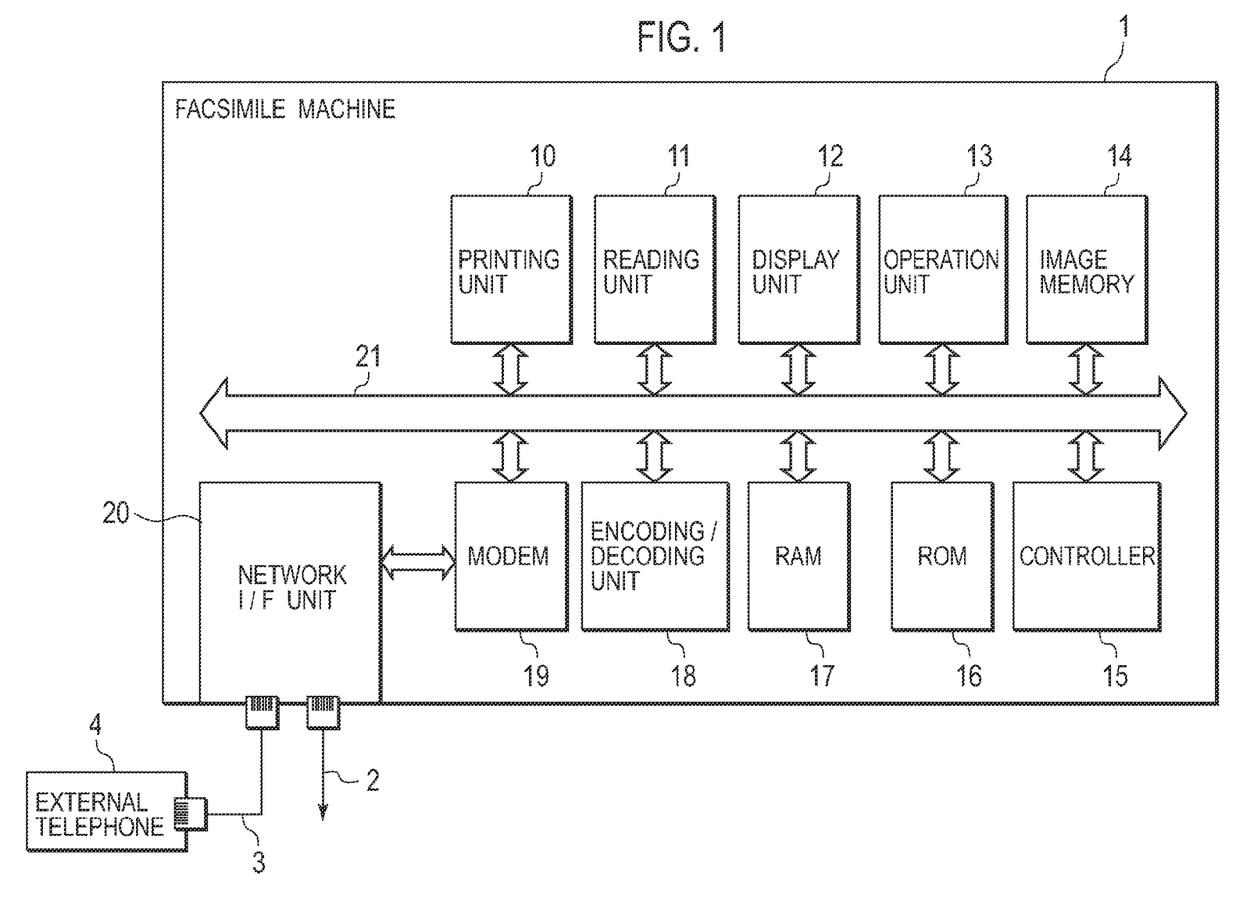
FIG. 1 is a block diagram of a configuration of a part of a facsimile machine serving as a communication terminal device of a first embodiment.
Figure 2:
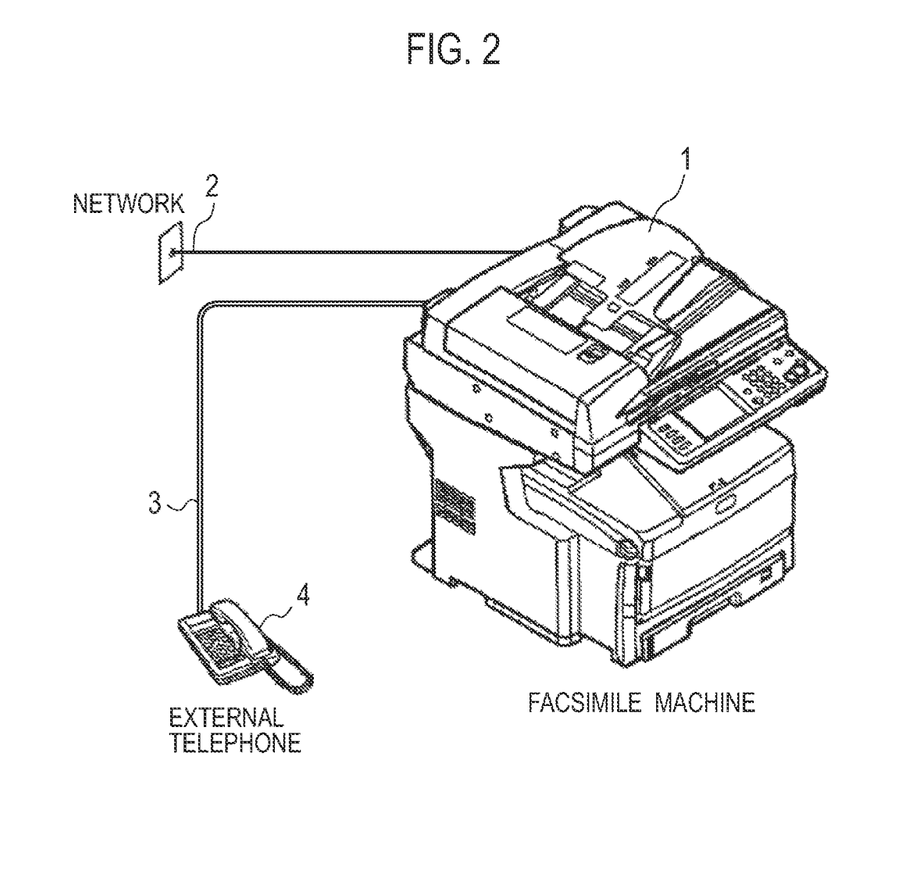
FIG. 2 is a perspective view of an example of the facsimile machine with an external telephone.

FIG. 1 is a block diagram showing a part of a facsimile machine serving as a communication terminal device of a first embodiment of the invention. FIG. 2 is a perspective view showing an example of the facsimile machine with an external telephone.

As shown in FIG. 1, facsimile machine 1 includes printing unit 10, reading unit 11, display unit 15, operation unit 13, image memory 14, controller 15, ROM 16, RAM 17, encoding/decoding unit 18, modem 19, network I/F (interface) unit 20, and data bus 21.

Printing unit 10 prints image data that are received by facsimile machine 1. Reading unit 11 scans a document that is to be facsimiled and converts the scanned data to image data. Display unit 15 is equipped with a LCD (Liquid Crystal Display) or a LED (Light Emitting Diode) for displaying the operating status of facsimile machine 10. Operation unit 13 includes a keypad such as a numeric keypad for dialing and various keys such as start/stop keys for performing each operation. Image memory 14 stores transmission image information and reception image information. Controller 15 controls the entire facsimile machine 10 according to various control programs stored in ROM 16. That is, controller 15 controls network I/F unit 20 directed to an aspect of the invention as well.

RAM 17 is used as a work area for controlling various required data and the entire facsimile machine. Encoding/decoding unit 18 compresses the transmission image information by a predetermined encoding method such as MH-MR-MMR encoding method or the like and expands the reception image information by a predetermined decoding method such as a MH-MR-MMR decoding method or the like. Modem 19 modulates facsimile data that is to be transmitted to network 2 via network I/F unit and demodulates facsimile date received from network 2 via network I/F unit 20. Data bus 21 connects the above components with each other. Facsimile machine 1 is connected to external telephone 4 with external telephone line 3 (see FIG. 2), and is also connected to network 2 (see FIG. 2).

Figure 3:
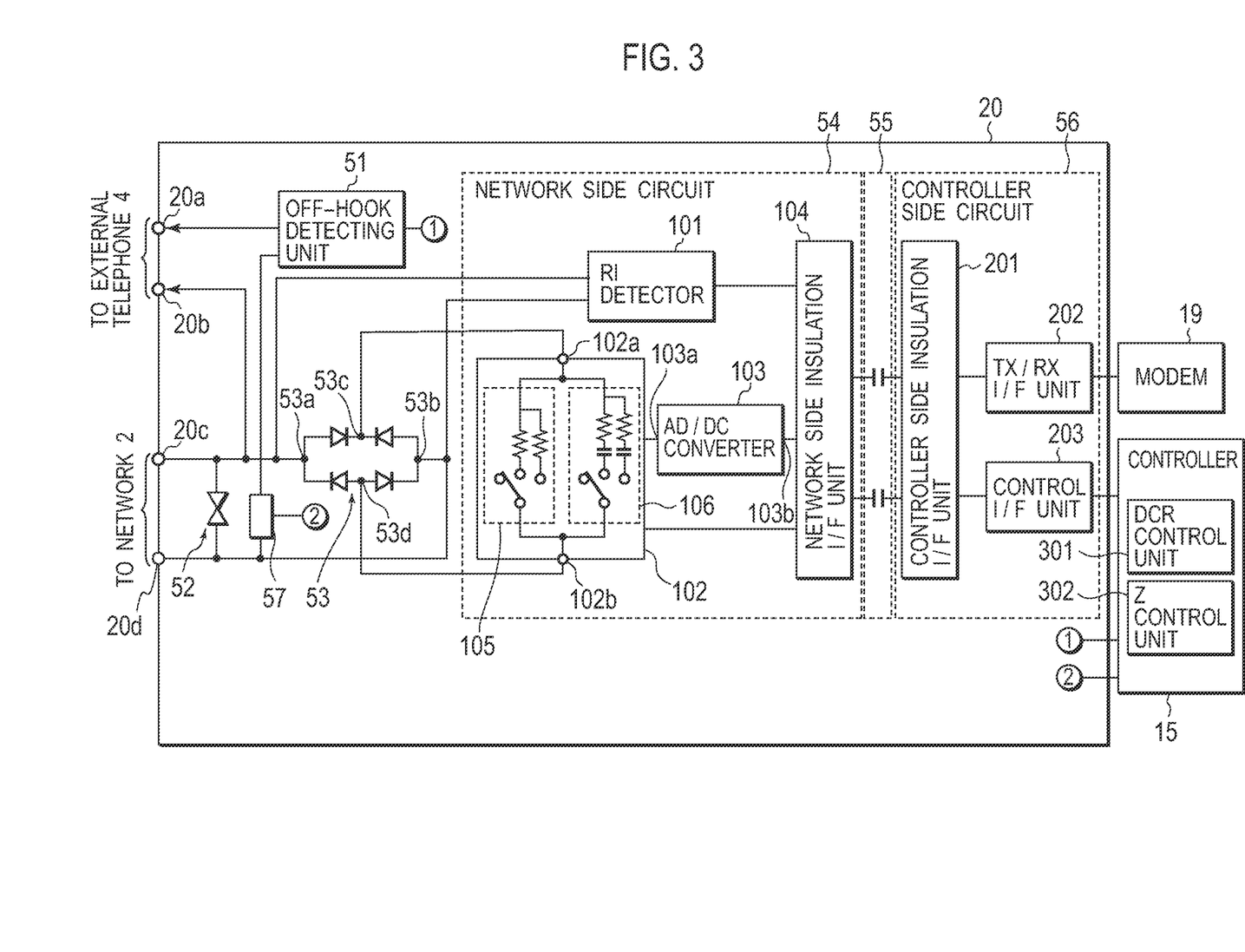
FIG. 3 is a block diagram of a configuration of a network I/F unit of the first embodiment, shown with a modem and a controller.

FIG. 3 is a block diagram of a configuration of network I/F unit 20 of the first embodiment, showing modem 19 and controller 15.

As shown in FIG. 3, network I/F unit 20 uses a semiconductor DAA (Data Access Arrangement) that is composed of network side circuit 54, controller side circuit 56, and insulation transmission unit 55. Insulation transmission unit 55 is a direct-current electrical insulator between circuits 55 and 56 and transmits data, signals and the like between circuits 55 and 56. Terminals 20a and 20b are connected to external telephone 4 via external telephone line 3 (see FIG. 1). Terminals 20c and 20d are to be connected to network 2.

Terminal 20c is connected to terminal 20d via varistor 52 serving as a surge protector and is connected with one of AC terminals (terminal 53a) of diode bridge 53. This terminal 53a is connected with a first input of RI detector 101 in network side circuit 54 and is connected with terminal 20b for external telephone 4 (FIG. 1). Terminal 20d is connected, via relay 57 controlled by controller 15, to off-hook detecting unit 51 serving as off-hook detector configured to detect an off-hook condition of external telephone 4, so that terminal 20d is connected to terminal 20a for external telephone 4 via off-hook detecting unit 51. Terminal 20d is also connected with the other AC terminal (AC terminal 53b) of diode bridge 53. The other AC terminal 53b of diode bridge 53 is connected to a second input of RI detector 101 provided in network side circuit 54. The detected signal output of off-hook detecting unit 51 is connected with controller 15.

Positive terminal 53c of diode bridge 53 is connected to one of input terminals (input terminal 102a) of hybrid network 102 provided in network side circuit 54, while negative terminal 53d of diode bridge 53 is connected to the other input terminal (input terminal 102b) of hybrid network 102. Hybrid network 102 includes therein direct-current resistance switching unit 105 serving as a direct-current resistance switcher or a direct-current resistance changer and impedance switching unit 106 serving as an impedance switcher or an impedance changer. The detected signal output of RI detector 101 is connected with network side insulation I/F unit 104.

Hybrid network 102 is connected with one of the connection terminals (connection terminal 103a) of AD/DA converter 103 and transmits and receives analog signals such as facsimile data, CNG signals and the like. Hybrid network 102 is also connected with insulation I/F unit 104 of network side circuit 54 and receives control signals. The other connection terminal (terminal 103b) of AD/DA converter 103 is connected with insulation I/F unit 104 of network side circuit 54.

Insulation I/F unit 104 of network side circuit 54 is connected with insulation transmission unit 55. Insulation transmission unit 55 is connected with insulation I/F unit 201 provided in controller side circuit 56. Insulation I/F unit 201 is connected with control I/F unit 203 and TX/RX IF unit 202. Modem 19 is connected with TX/RX IF unit 202 provided in controller side circuit 56. Controller 15 is connected with control I/F unit 203 provided in controller side circuit 56. Controller 15 includes therein direct-current-resistance switching control unit (DCR control unit) 301 serving as a direct-current-resistance switching controller or a direct-current-resistance changing controller and impedance switching control unit (Z control unit) 302 serving as an impedance switching controller or an impedance changing controller.

Figure 4:
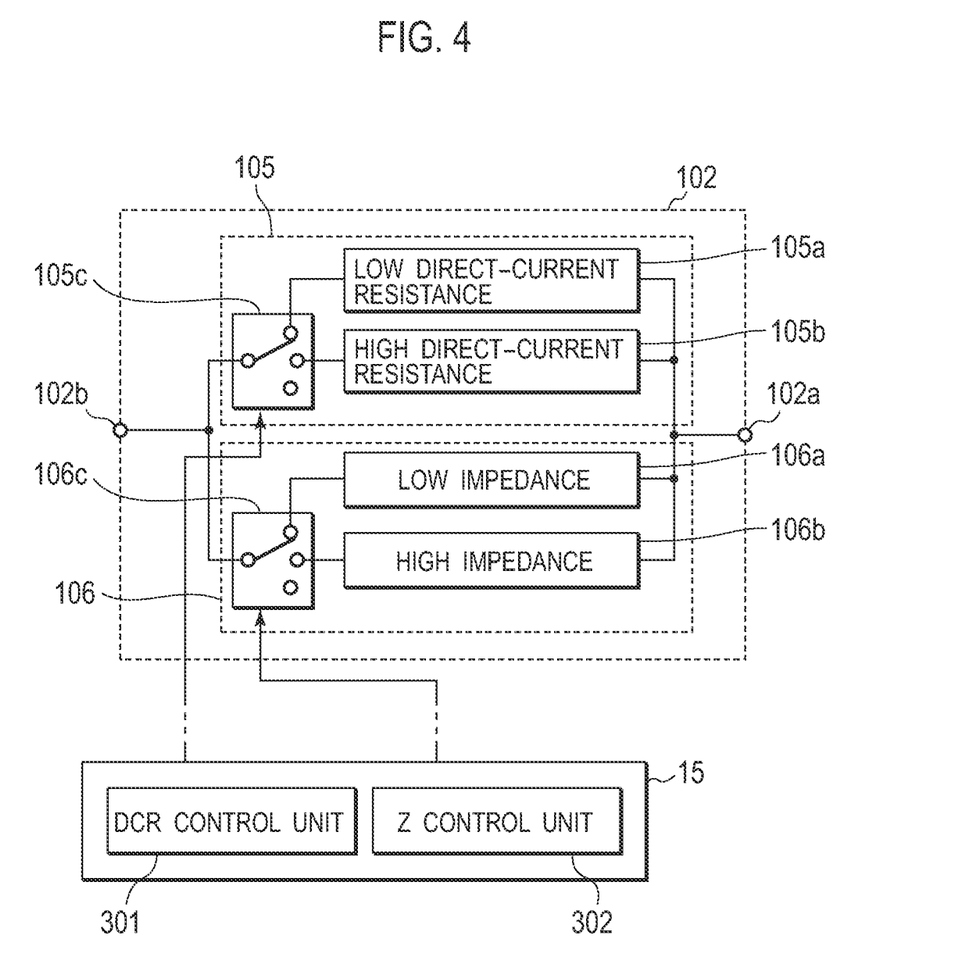
FIG. 4 is a circuit block diagram showing an internal configuration of hybrid network 102 and a connection relationship between hybrid network 102 and a controller that controls switching of hybrid network 102.

FIG. 4 is a circuit block diagram showing a connection of an internal configuration of hybrid network 102 and showing a connection configuration between hybrid network 102 and controller 15 which performs a switching control of hybrid network 102.

As shown in FIG. 4, hybrid network 102 includes therein direct-current resistance switching unit 105 and impedance switching unit 106. Direct-current resistance switching unit 105 has switch 105c which is operated by direct-current-resistance switching control unit 301 of controller 15 so that switch 105c can selectively connect with a terminal that is connected to low direct-current resistance 105a, a terminal that is connected to high direct-current resistance 105b, or an open terminal. Impedance switching unit 106 has switch 106c which is operated by impedance switching control unit 302 of controller 15 so that switch 106c can selectively connect with a terminal that is connected to low impedance 106a, a terminal that is connected to high impedance 106b, or an open terminal. For example, low direct-current resistance 105a, high direct-current resistance 105b, low impedance 106a and high impedance 106b are designed to have about 250Ω, 10 KΩ, 600Ω and 20 KΩ, respectively in this embodiment but are not limited to these in the invention.

The control signal from controller 15 is transmitted through control I/F unit 203 to insulation I/F unit 201, converted from a parallel signal to a serial signal by insulation I/F unit 201, transmitted through insulation transmission unit 55 to insulation I/F unit 104 of the network side circuit, converted from a serial signal to a parallel signal by insulation I/F unit 104, and then transmitted to hybrid network 102.

Next, operation of each component will be described based on the described connection configuration.

RI detector 101 receives a ring signal (an analog signal) that is input from network 2 to terminals 20c and 20d and converts the received ring signal to a digital signal and transmits the digitized ring signal to insulation I/F unit 104 of network side circuit 54. Off-hook detecting unit 51 detects an off-hook condition of external telephone 4 and then transmits to controller 15 an off-hook detect signal indicating the off-hook condition of external telephone 4. Off-hook means taking a call by external telephone 4, for example, by picking up the receiver of external telephone 4 by a user.

Note that off-hook detecting unit 51 may use a photo coupler or an electric current sensor. Off-hook detecting unit 51 using the photo coupler has such a structure that a light emitting side of the photo coupler is connected in series with external telephone 4 and the output of a transistor, which is a light receiving side of the photo coupler, is connected to controller 15. Off-hook detecting unit 51 using the current sensor has such a structure that a coil of the current sensor is connected in series with external telephone 4 and a hall element is connected to controller 15.

Diode bridge 53 receives either polarity of input from the network and provides the same polarity output to the semiconductor DAA. Hybrid network 105 adjusts the impedance and direct-current resistance of the network side. Network side insulation I/F unit 104 converts signals to be transmitted to insulation transmission unit 55 from parallel data into serial data and converts signals that are received from insulation transmission unit 55 from serial data into parallel data. Controller side insulation I/F unit 201 converts signals to be transmitted to insulation transmission unit 55 from parallel data into serial data and converts signals that are received from insulation transmission unit 55 from serial data into parallel data.

TX/RX IF unit 202 converts signals that are to be transmitted to modem 19 into serial data from parallel data and converts signals that are received from modem 19 into parallel data from serial data. Control I/F unit 203 is an interface to connect controller 15 to controller side insulation I/F unit 201 so as to transfer the control signal from controller 15 to controller side insulation I/F unit 201.

Figure 5:
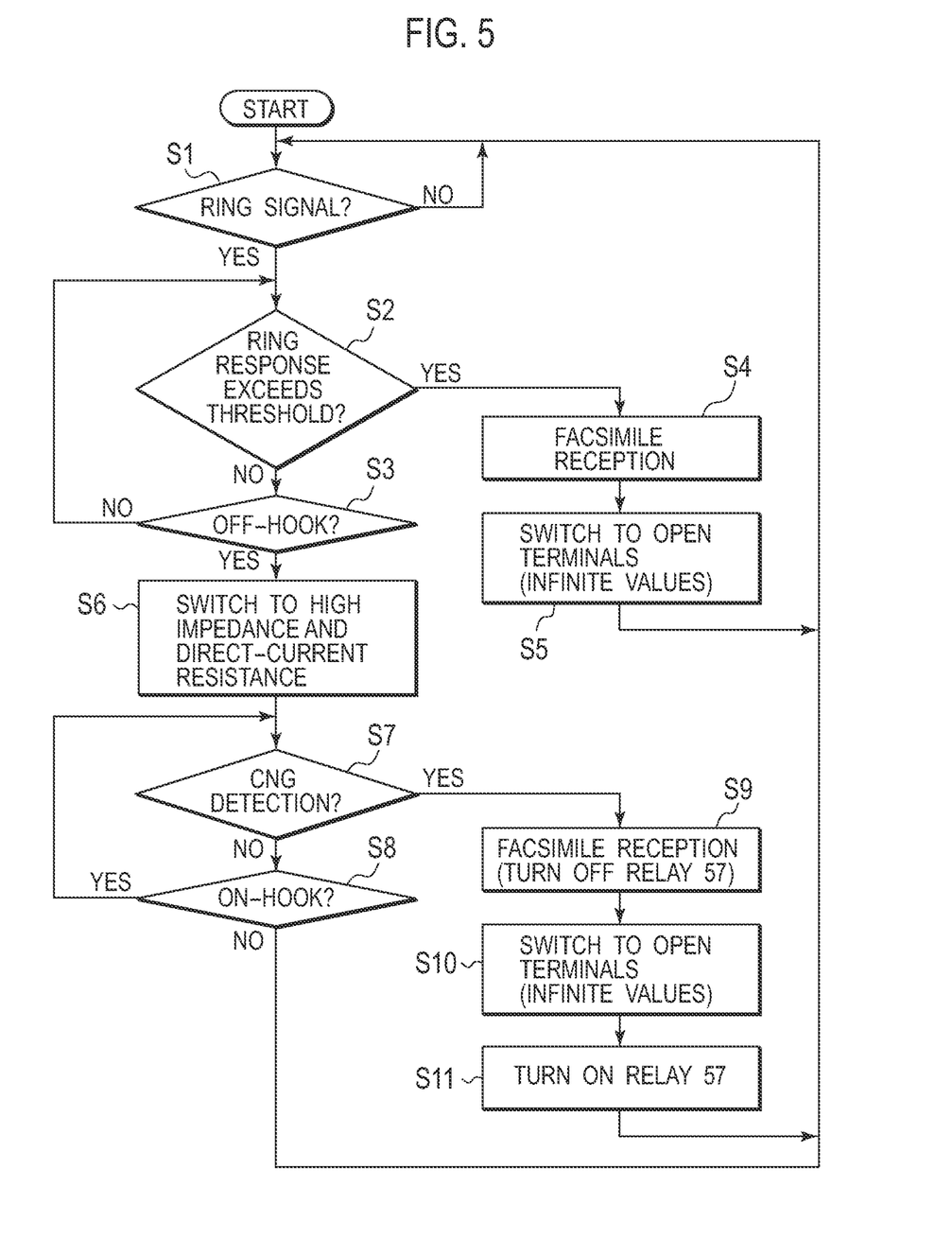
FIG. 5 is a flow chart of an operation of the facsimile machine of the first embodiment, including a case where the facsimile machine is switched to an automatic reception.

Next, operation of facsimile machine 1 will be described according to the described configuration. FIG. 5 is a flow chart of the operation of facsimile machine 1 including a case where facsimile machine 1 is switched to an automatic reception when external telephone 4 connected to facsimile machine 1 takes a call that is received from another facsimile machine. The operation will be described based mainly on the flow chart with reference to FIGS. 1 to 4.

Upon starting the flow, facsimile machine 1 is in a wait state waiting for a ring signal from another facsimile machine. Note that upon starting the flow, in the initial phase, direct-current resistance switching unit 105 of hybrid network 102 is set to the open terminal (which means an infinite resistance) by switch 105*c* (FIG. 4), impedance switching unit 106 is set to the open terminal (which means an infinite impedance) by switch 105*c* (FIG. 4), and relay 57 is set to be turned on (a connected state).

Upon receiving a ring signal, RI detector 101 detects and digitizes the ring signal and the digitized ring signal is transmitted to controller 15 via network side insulation I/F unit 104, insulation transmission unit 55, insulation I/F unit 201, and control I/F unit 203. Controller 15 determines whether or not the transmitted ring signal (digital signal) is a valid ring signal (step S1). Note that the ring signal that RI detector 101 detects is a signal having a one-second on state and a two-second off state, alternatively, with AC 75 [Vrms] and 16 [Hz].

When controller 15 determines that the transmitted ring signal is a valid ring signal (step S1, Yes), controller 15 determines whether or not a ring response time, which is a duration of receiving the ring signal, exceed a ring response time threshold which the user has set previously, and determines whether or not off-hook detecting unit 51 detects an off-hook condition of external telephone 4 within the threshold (steps S2, S3). Note that the ring response time threshold can be selected from the group of 5, 10, 15 and 20 seconds in general, and can be selected by the user in this embodiment.

When the ring response time exceeds the ring response time threshold (step S2, Yes), a facsimile reception is executed (step S4). In the facsimile reception, direct-current-resistance switching control unit 301 in controller 15 instructs switch 105*c* of direct-current resistance switching unit 105 to select low direct-current resistance 105*a* (FIG. 4) and impedance switching control unit 302 in controller 15 instructs switch 106*c* of impedance switching unit 106 to select low impedance 106*a* (FIG. 4), respectively. Upon completing the facsimile reception, direct-current-resistance switching control unit 301 and impedance switching control unit 302 in controller 15 instructs switches 105*c* and 106*c* to select the open terminals (FIG. 4), respectively (step S5), and then facsimile machine 1 is in a wait state waiting for the next ring signal.

On the other hand, when an off-hook condition of external telephone 4 is detected within the threshold (step S3, Yes), direct-current-resistance switching control unit 301 in controller 15 instructs direct-current resistance switching unit 105 to select high direct-current resistance 105*b* by switch 105*c* (FIG. 4) and impedance switching control unit 302 in controller instructs impedance switching unit 106 to select high impedance 106*b* by switch 106*c* (FIG. 4)(step S6). Next, it is determined whether or not a CNG signal (which is a calling tone that is a standard of the International Telecommunication Union Telecommunication Standardization Sector (ITU-T)) is received from network 2, and determined whether or not off-hook ends before receiving the CNG signal (steps S7, S8).

CNG signal is a signal indicating a non-voice communications that has 0.5-second on state and 3-second off state, alternatively, with 1100 [Hz]. CNG signal is transmitted through terminal 20*c*, 20*d*, diode bridge 53, and hybrid network 102 to AD/DA converter 103, and converted into a digital signal by AD/DA converter 103. The digitalized CNG signal is further transmitted through network side insulation I/F unit 104, insulation transmission unit 55, insulation I/F unit 201, and TX/RXIF unit 202 to modem 19, and then detected by modem 19.

When a CNG signal is detected (step S7, Yes), which means a facsimile transmission, facsimile machine 1 performs a facsimile reception (step S9). In the facsimile reception, controller 15 instructs relay 57 to be turned off (=an unconnected state), and direct-current-resistance switching control unit 301 and impedance switching control unit 302 in controller 15 instruct switch 105*c* of direct-current resistance switching unit 105 and switch 106*c* of impedance switching unit 106 to select low direct-current resistance 105*a* and low impedance 106*a* (FIG. 4), respectively, in the same way as step S4 described above.

Upon completing the facsimile reception, direct-current-resistance switching control unit 301 and impedance switching control unit 302 in controller 15 instruct switches 105*c* and 106*c* to select the open terminals (FIG. 4), and controller 15 instructs relay 58 to be turned on (a connected state) (step S11), and then facsimile machine 1 is in a wait state waiting for the next ring signal.

The operation based on the flow chart will be further described.

A direct current resistance and an impedance of network I/F unit 20 seen from the network 2 side are value of a parallel circuit of the direct-current resistance (or the infinite resistance) and the impedance (or the infinite impedance) that are selected by hybrid network 102 and a direct-current resistance (or an infinite resistance caused by the relay) of the external telephone 4 and an impedance (or an infinite impedance caused by the relay) of the external telephone 4. In the off-hook condition external telephone 4 has the direct-current resistance of 200Ω to 300Ω and the impedance of about 600Ω. In the on-hook condition external telephone 4 has the direct-current resistance that is much higher than 250Ω and has the impedance of 20 kΩ to 30 kΩ. The direct-current resistance and impedance of network 2 that are seen from network I/F unit 20 side are 50Ω to 300Ω and about 600Ω, respectively.

By means of network I/F unit 20, which operates according to the flow chart, upon a facsimile reception in step S4 or step S9, external telephone 4 is disconnected due to the on-hook condition or the relay-off. The direct current resistance value and the impedance value of network I/F unit 20 that are seen from the network 2 side are determined almost by low direct-current resistance 105*a* (250Ω) and low impedance 106*a* (600Ω) of hybrid network 102.

Further, when off-hook of external telephone 4 is detected in step S3 or step S8, the direct-current resistance and the impedance of hybrid network 102 are infinite values or high direct-current resistance 105*b* (10 k Ω) and high impedance 106*b* (20 k Ω), respectively. The direct-current resistance and impedance of network I/F unit 20 that are seen form network 2 side are thus determined almost by the direct-current resistance (200Ω to 300Ω) and the impedance (600Ω) of off-hook external telephone 4. Therefore, network I/F unit 20 can always adapt its impedance to network in either case of CNG signal reception by off-hook external telephone 4 or the facsimile reception.

According to facsimile machine 1 of the first embodiment as described above, when off-hook detecting unit 51 provided between facsimile machine 1 and the external telephone detects the off-hook condition, CNG signal is received and the impedance and direct-current resistance of the semiconductor DAA with respect to network 2 are set to high values. Therefore, this embodiment can adapt the impedance of the semiconductor DAA to network, without a high impedance tone detecting transformer in addition to the semiconductor DAA. This eliminates the requirement for space for mounting the high impedance transformer and thereby enables downsizing of the circuit board and reduction of the cost of the circuit.

Second Embodiment

Figure 6:
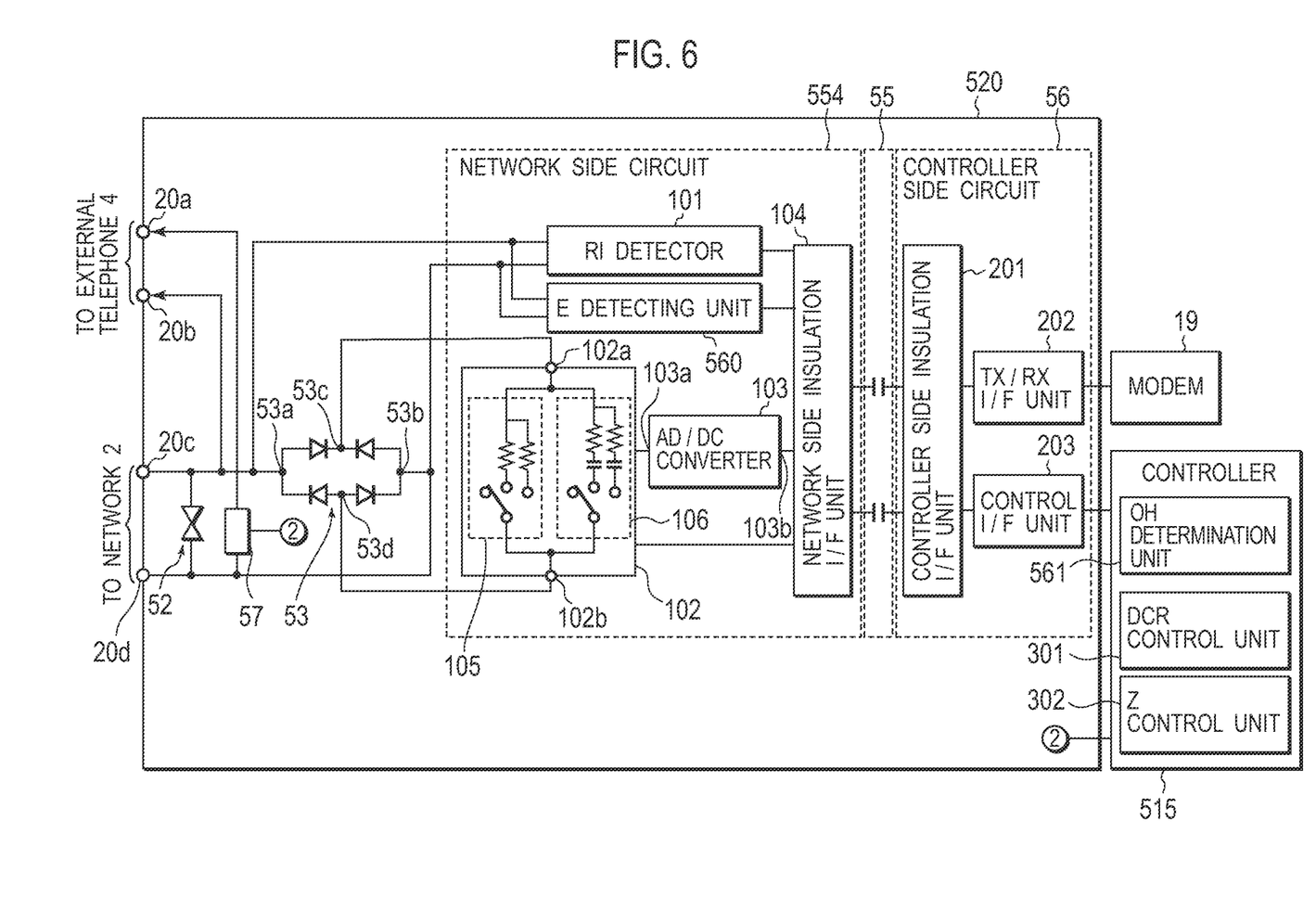
FIG. 6 is a block diagram of a configuration of a network I/F unit of a facsimile machine of a second embodiment, showing a modem and a controller as well as the network I/F unit.

FIG. 6 is a block diagram showing a configuration of network I/F unit 520 with modem 19 and controller 515 connected thereto of a facsimile machine of a second embodiment according to the invention.

In the facsimile machine using network I/F unit 520 and controller 515 according the second embodiment, unlike facsimile machine 1 of the first embodiment as shown in FIG. 1, network side circuit 554 of network I/F unit 520 has network voltage detecting unit 560 serving as a network voltage detector which monitors a network voltage instead of off-hook detecting unit 51 (FIG. 3), and controller 515 has off-hook determination unit 561 serving as an off-hook determiner. In the facsimile machine of the second embodiment incorporating network I/F unit 520 and controller 515, the same constituents as those of facsimile machine 1 (FIG. 1) of the first embodiment are designated by the same reference numerals and duplicate explanation as to the same constituents is omitted. Note that the following description will partially refer FIG. 1 as needed, since the configuration of the facsimile machine according to the second embodiment is the same as those of facsimile machine 1 of the first embodiment shown in FIG. 1, except for some parts in network I/F unit 502 and controller 515.

Network voltage detecting unit 560 detects the network voltage and transmits the detected signal to controller 515 through network side insulation I/F unit 104, insulation transmission unit 55, insulation I/F unit 201, and control I/F unit 203. Off-hook determination unit 561 of controller 515 determines that external telephone is off-hook if the detected network voltage is lower than a predetermined reference voltage.

The flow of operation of the facsimile machine according to the second embodiment, including a case where the facsimile machine is switched to an automatic reception when external telephone 4 connected to the facsimile machine takes a call that is from another facsimile machine, is the same as that of the first embodiment shown in FIG. 5, except for an off-hook determination process in step S3 and step S7 in FIG. 5. Therefore, the following description will explain the off-hook determination process according to the second embodiment and the other processes that are the same as those of the first embodiment will be omitted.

Figure 7:
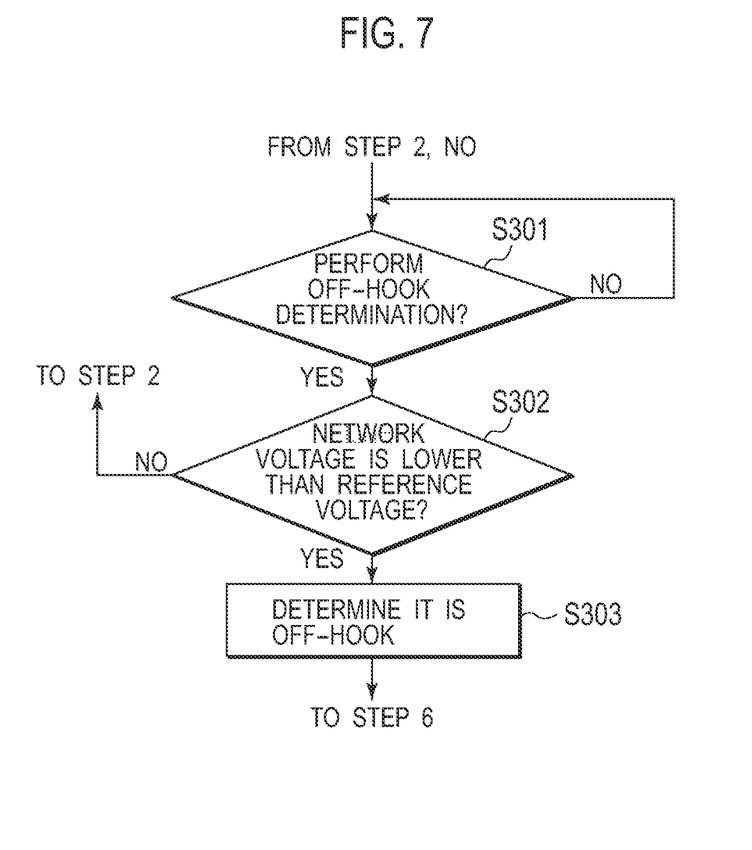
FIG. 7 is a flow chart of an off-hook determination process of the second embodiment which is performed instead of step S3 in FIG. 5 of the first embodiment.

FIG. 7 is a flow chart of the flow of the off-hook determination process of the second embodiment, which replaces step S3 in the flow chart of FIG. 5. As shown in FIG. 7, steps S301 to S303 in FIG. 7 replace step S3 in the flow chart of FIG. 5.

In the off-hook determination process of steps S301 to S303 in FIG. 7, which corresponds to step S3 in the flow chart of FIG. 5, controller 15 determines whether or not to perform the off-hook determination (step S301). When controller 15 performs the off-hook determination (step S301, Yes), it is determined whether or not the network voltage detected by network voltage detecting unit 560 is lower than the predetermined reference voltage (step S302). When the network voltage is the same as or higher than the predetermined reference voltage (step S302, No), it is determined that it is not an off-hook state and the process proceeds back to step S2. When the network voltage is lower than the predetermined reference voltage (step S302, Yes), it is determined that it is an off-hook state and the process proceeds to step S6.

Similarly, the off-hook determination process of steps S301 to S303 in FIG. 7 replace step S7 in the flow chart of FIG. 5. Therefore, the facsimile machine of the second embodiment can perform the same or similar process described in the first embodiment including a case where facsimile machine 1 is switched to an automatic reception when external telephone 4 connected to facsimile machine 1 takes a call that is from another facsimile machine.

As described above, the facsimile machine of the second embodiment can achieve the same effect as the first embodiment. Further, the facsimile machine of the second embodiment can eliminate an off-hook detector and space for it, thereby making the size of the circuit board smaller than that of the first embodiment and further reducing the cost of the circuit.

Although the facsimile machines are described as a communication terminal device in the embodiments describe above, the invention can be applied to a telephone incorporating therein a facsimile function, a device such as a multifunction printer that is connected a telephone network and is capable of being connected with an external telephone, or the like.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A communication terminal device capable of being connected with an external telephone and of receiving and transmitting facsimile data from and to a network, comprising:

an off-hook detector configured to detect an off-hook condition of the external telephone, a semiconductor DAA (Digital Access Arrangement) including an impedance switcher configured to switch impedances and a direct-current resistance switcher configured to switch direct-current resistances;

an impedance switching controller configured to instruct the impedance switcher to switch the impedances;

a direct-current resistance switching controller configured to instruct the direct-current resistance switcher to switch the direct-current resistances, wherein, when the off-hook detector detects the off-hook condition of the external telephone, the impedance switching controller instructs the impedance switcher to switch the impedances and the direct-current resistance switching controller instructs the direct-current resistance switcher to switch the direct-current resistances, wherein the off-hook detector comprises one of a photocoupler to detect the off-hook condition of the external telephone, or a current detecting element to detect the off-hook condition of the external telephone.

2. The communication terminal device according to claim 1, further comprising an encoding/decoding unit configured to convert image information corresponding to the facsimile data into compressed data and uncompressed data, respectively.

3. The communication terminal device according to claim 1, further comprising a surge detector connected between first and second terminals that connect the communication terminal device to the network.

4. The communication terminal device according to claim 1, wherein the impedance switching controller is further configured to determine whether a ring response time exceeds a ring response time threshold, wherein the ring response time threshold is settable by a user.

5. A communication terminal device capable of being connected with an external telephone and of receiving and transmitting facsimile data from and to a network, comprising:

an off-hook detector configured to detect an off-hook condition of the external telephone, a semiconductor DAA (Digital Access Arrangement) including an impedance switcher configured to switch impedances and a direct-current resistance switcher configured to switch direct-current resistances;

an impedance switching controller configured to instruct the impedance switcher to switch the impedances;

a direct-current resistance switching controller configured to instruct the direct-current resistance switcher to switch the direct-current resistances, wherein, when the off-hook detector detects the off-hook condition of the external telephone, the impedance switching controller instructs the impedance switcher to switch the impedances and the direct-current resistance switching controller instructs the direct-current resistance switcher to switch the direct-current resistances, wherein the impedance switcher is capable of selecting at least one of a first impedance and a second impedance that is higher than the first impedance, the direct-current resistance switcher is capable of selecting at least one of a first direct-current resistance and a second direct-current resistance that is higher than the first direct-current resistance, the impedance switching controller instructs the impedance switcher to select the second impedance upon detection of the off-hook condition of the external telephone and instructs the impedance switcher to select the first impedance upon a facsimile data reception, the direct-current resistance switching controller instructs the direct-current resistance switcher to select the second direct-current resistance upon detection of the off-hook condition of the external telephone and instructs the direct-current resistance switcher to select the first direct-current resistance, upon a facsimile data reception.

6. The communication terminal device according to claim 5, wherein the impedance switcher is capable of selecting a third impedance that is higher than the second impedance, in addition to the first impedance and the second impedance, the direct-current resistance switcher is capable of selecting a third direct-current resistance that is higher than the second direct-current resistance, in addition to the first direct-current resistance and the second direct-current resistance, the impedance switching controller instructs the impedance switcher to select the third impedance upon a wait state waiting for a ring signal, and the direct-current resistance switching controller instructs the direct-current resistance switcher to select the third direct-current resistance upon a wait state waiting for a ring signal.

7. The communication terminal device according to claim 6, wherein the third impedance is a resistance in a state where the impedance switcher selects an open terminal, and the third direct-current resistance is an impedance in a state where the direct-current resistance switcher selects an open terminal.

8. The communication terminal device according to claim 6, wherein, the first impedance is about 600Ω, the second impedance is about 20 kΩ, the first direct-current resistance is about 250Ω, and the second direct-current resistance is about 10 kΩ.

9. The communication terminal device according to claim 8, wherein the third impedance is a resistance in a state where the impedance switcher selects an open terminal, and the third direct-current resistance is an impedance in a state where the direct-current resistance switcher selects an open terminal.

10. A communication terminal device capable of being connected with an external telephone and of receiving and transmitting facsimile data from and to a network, comprising:

a network voltage detector configured to detect a network voltage;

an off-hook determiner configured to determine whether or not the external telephone is off-hook by comparing the detected network voltage detected by the network voltage detector with a reference voltage;

a semiconductor DAA (Data Access Arrangement) including an impedance switcher to switch impedances and a direct-current resistance switcher to switch direct-current resistances;

an impedance switching controller configured to instruct the impedance switcher to switch the impedances;

a direct-current resistance switching controller configured to instruct the direct-current resistance switcher to switch the direct-current resistances, wherein, when the off-hook determiner determines that the external telephone is off-hook, the impedance switching controller instructs the impedance switcher to switch the impedances and the direct-current resistance switching controller instructs the direct-current resistance switcher to switch the direct-current resistances, wherein the impedance switcher is capable of selecting at least one of a first impedance and a second impedance that is higher than the first impedance, the direct-current resistance switcher is capable of selecting at least one of a first direct-current resistance and a second direct-current resistance that is higher than the first direct-current resistance, the impedance switching controller instructs the impedance switcher to select the second impedance upon detection of the external telephone being off-hook and instructs the impedance switcher to select the first impedance, upon a facsimile data reception, the direct-current resistance switching controller instructs the direct-current resistance switcher to select the second direct-current resistance upon detection of the external telephone being off-hook and instructs the direct-current resistance switcher to select the first direct-current resistance, upon a facsimile data reception.

11. The communication terminal device according to claim 10, wherein the impedance switcher is capable of selecting a third impedance that is higher than the second impedance, in addition to the first impedance and the second impedance, the direct-current resistance switcher is capable of selecting a third direct-current resistance that is higher than the second direct-current resistance, in addition to the first direct-current resistance and the second direct-current resistance, the impedance switching controller instructs the impedance switcher to select the third impedance upon a wait state waiting for a ring signal, and the direct-current resistance switching controller instructs the direct-current resistance switcher to select the third direct-current resistance upon a wait state waiting for a ring signal.

12. The communication terminal device according to claim 11, wherein the third impedance is a resistance in a state where the impedance switcher selects an open terminal, and the third direct-current resistance is an impedance in a state where the direct-current resistance switcher selects an open terminal.

13. The communication terminal device according to claim 11, wherein, the first impedance is about 600Ω, the second impedance is about 20 kΩ, the first direct-current resistance is about 250Ω, and the second direct-current resistance is about 10 kΩ.

14. The communication terminal device according to claim 13, wherein the third impedance is a resistance in a state where the impedance switcher selects an open terminal, and the third direct-current resistance is an impedance in a state where the direct-current resistance switcher selects an open terminal.

15. The communication terminal device according to claim 5, further comprising an encoding/decoding unit configured to convert image information corresponding to the facsimile data into compressed data and uncompressed data, respectively.

16. The communication terminal device according to claim 5, further comprising a surge detector connected between first and second terminals that connect the communication terminal device to the network.

17. The communication terminal device according to claim 5, wherein the impedance switching controller is further configured to determine whether a ring response time exceeds a ring response time threshold, wherein the ring response time threshold is settable by a user.

* * * * *